(12) United States Patent
Vastmans et al.

(10) Patent No.: US 8,313,247 B2
(45) Date of Patent: Nov. 20, 2012

(54) POSITIONING OF ADAPTORS FOR OPTICAL CONNECTORS

(75) Inventors: Kristof Vastmans, Boutersem (BE); Luiz Neves Mendes, Begijnendijk (BE); Ronnie Rosa Georges Liefsoens, Tessenderlo (BE)

(73) Assignee: Tyco Electronics Raychem BVBA, Kessel-Lo (BE)

( * ) Notice: Subject to any disclaimer, the term of this patent is extended or adjusted under 35 U.S.C. 154(b) by 105 days.

(21) Appl. No.: 12/733,814

(22) PCT Filed: Sep. 5, 2008

(86) PCT No.: PCT/GB2008/050791
§ 371 (c)(1),
(2), (4) Date: Mar. 22, 2010

(87) PCT Pub. No.: WO2009/040568
PCT Pub. Date: Apr. 2, 2009

(65) Prior Publication Data
US 2010/0209050 A1    Aug. 19, 2010

(30) Foreign Application Priority Data
Sep. 24, 2007    (GB) .................................. 0718589.5

(51) Int. Cl.
*G02B 6/36* (2006.01)
*G02B 6/38* (2006.01)
(52) U.S. Cl. .......................................... 385/53; 385/55
(58) Field of Classification Search .................... 385/53, 385/55
See application file for complete search history.

(56) References Cited

U.S. PATENT DOCUMENTS

| | | | | | |
|---|---|---|---|---|---|
| 6,123,579 | A | * | 9/2000 | Ping | 439/557 |
| 6,227,718 | B1 | * | 5/2001 | Harvey et al. | 385/55 |
| 6,857,788 | B1 | * | 2/2005 | Dugas | 385/75 |
| 7,473,039 | B2 | * | 1/2009 | Yi et al. | 385/92 |

FOREIGN PATENT DOCUMENTS

| | | |
|---|---|---|
| EP | 0 997 752 A | 5/2000 |
| WO | WO 2007/039585 A | 4/2007 |

OTHER PUBLICATIONS

International Search Report for PCT/GB2008/050791 issued by the European Patent Office on Dec. 15, 2008.

* cited by examiner

*Primary Examiner* — Uyen Chau N Le
*Assistant Examiner* — Chris Chu
(74) *Attorney, Agent, or Firm* — Faegre Baker Daniels LLP

(57) ABSTRACT

An assembly of a mounting support and an optical fibre connector adaptor (20) mounted on the support, wherein the adaptor has a connector-receiving axis and at least one lateral (to the said axis) mounting projection (25) on at least a first one of its sides, and the mounting support comprises wall members (not necessarily flat or continuous) upstanding from the support on both sides of the said adaptor, which wall members on at least one side of the adaptor define mounting slots adapted to receive the said mounting projections of the adaptor, and wherein the slots are formed to permit movement of the adaptor between at least a first position in which the adaptor is supported with its said axis at an acute angle to the support, and a working position in which the adaptor is supported with its said axis lying substantially parallel to the support, and wherein the wall members define, in at least one of the said slots, at least one shoulder (30) on which one of the mounting projections (25) of the adaptor can be supported, and at least one resilient portion (35) of the wall member is arranged to retain that mounting projection removably on the said shoulder.

8 Claims, 6 Drawing Sheets

POSITIONING OF ADAPTORS FOR OPTICAL CONNECTORS

Figure 1:
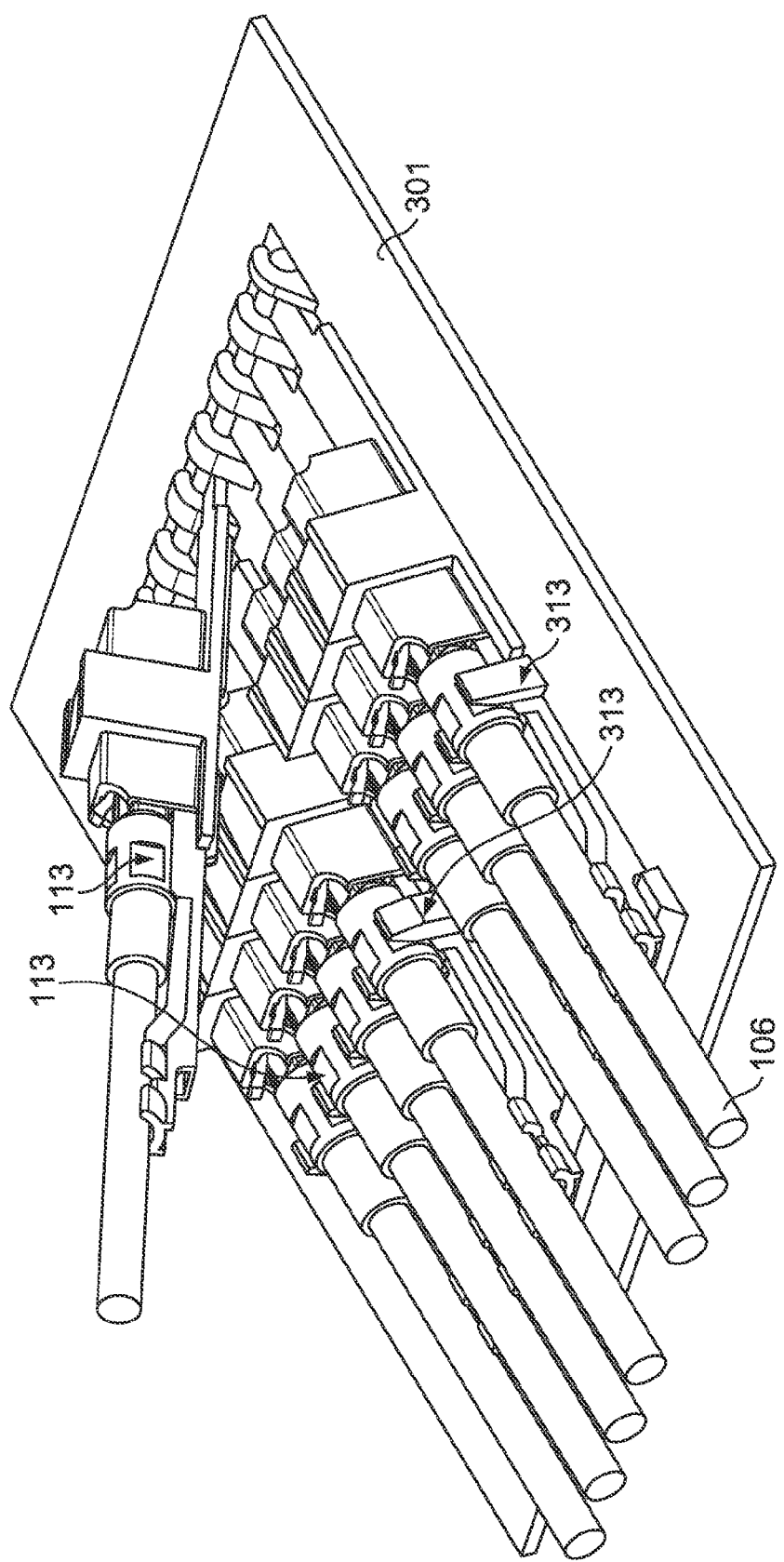

This invention relates to improved positioning of adaptors for holding optical connectors, known examples of which are described in WO-A-2007/039585 (ETO080), FIG. III-2 of which is attached hereto as FIG. 1 (Prior Art).

The accompanying FIG. 1 (Prior Art) shows an optical fibre connection device including a pivotable mounting, which consists of a baseplate 301 and pivoting arm 302 for retaining a connector attached to an optical drop cable 106. The pivoting part 302 carries a simplex adaptor 304 of known kind enclosing the forward part of a known LC optical connector, the release tab 108 of which can be seen projecting from the adaptor 304. The adaptor 304 is retained on the pivoting part 302 by frame 320 moulded integrally with the part 302. Pivoting the part 302 upwards away from the baseplate 301 as shown improves access for connecting and disconnecting the connectorised cable to the connector part enclosed in the selected adaptor 304. On pivoting the part 302 down, upstanding location members/mounting retainers 313 engage the flat lands 113 on a connectorised optical fibre cable. This provides resistance to both longitudinal and torsional movement of the connector parts. U.S. Pat. No. 6,227,718 describes a tiltable adaptor that requires a separate coil spring to be fitted below the adaptor to retain it in position.

The present invention provides a simplified form of mounting for use in a drop cable array or in other optical cable handing or organising devices. The invention accordingly provides an assembly of a mounting support and an optical fibre connector adaptor mounted on the support, wherein the adaptor has a connector-receiving axis and at least one lateral (to the said axis) mounting projection on at least a first one of its sides, and the mounting support comprises wall members (not necessarily flat or continuous) upstanding from the support on both sides of the said adaptor, which wall members on at least one side of the adaptor define mounting slots adapted to receive the said mounting projections of the adaptor, and wherein the slots are formed to permit movement of the adaptor between at least a first position in which the adaptor is supported with its said axis at an acute angle to the support, and a working position in which the adaptor is supported with its said axis lying substantially parallel to the support, and wherein the wall members define, in at least one of the said slots, at least one shoulder on which one of the mounting projections of the adaptor can be supported, and at least one resilient portion of the wall member is arranged to retain that mounting projection removably on the said shoulder.

The assembly according to this invention advantageously does not require a movable pivoting part or a separate coil spring, and so may be more economically manufactured than the known devices. In preferred forms of the invention, the adaptor has at least one (preferably two) of the said mounting projections (preferably rounded bosses) on each of its sides. Preferably, the slots are arranged to hold the adaptor positively (preferably resiliently) in the said first position. It may be especially preferred that the wall members define, in at least one of the said slots, at least one shoulder on which one of the mounting projections of the adaptor can be supported, and at least one resilient portion of the wall member is arranged to retain that mounting projection removably on the said shoulder. It may also be preferred that the slots are arranged to hold the adaptor loosely in the said working position.

The adaptors and mounting supports of assemblies according to this invention may be produced using any convenient moulding or other techniques and materials, for example those used to make the known simplex adaptors.

Figure 2:
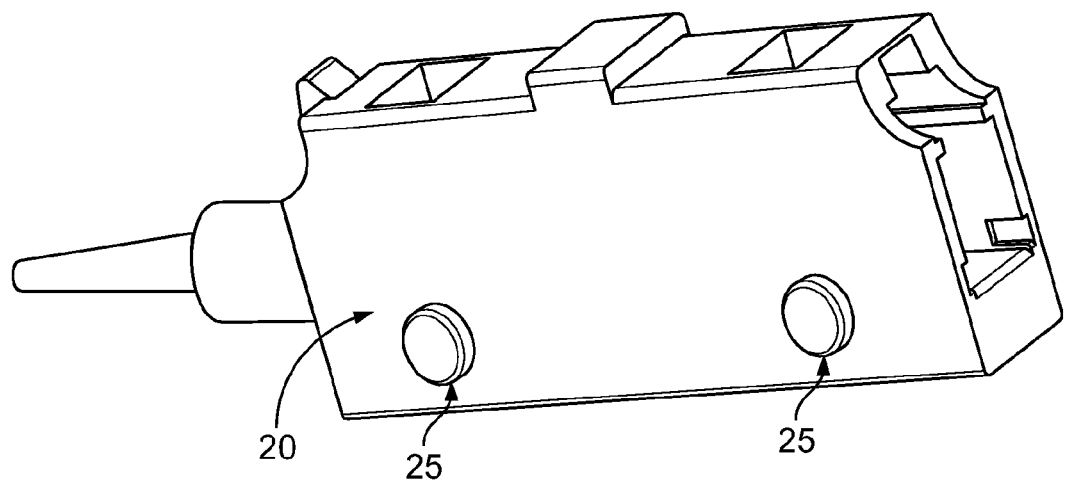
Figure 3:
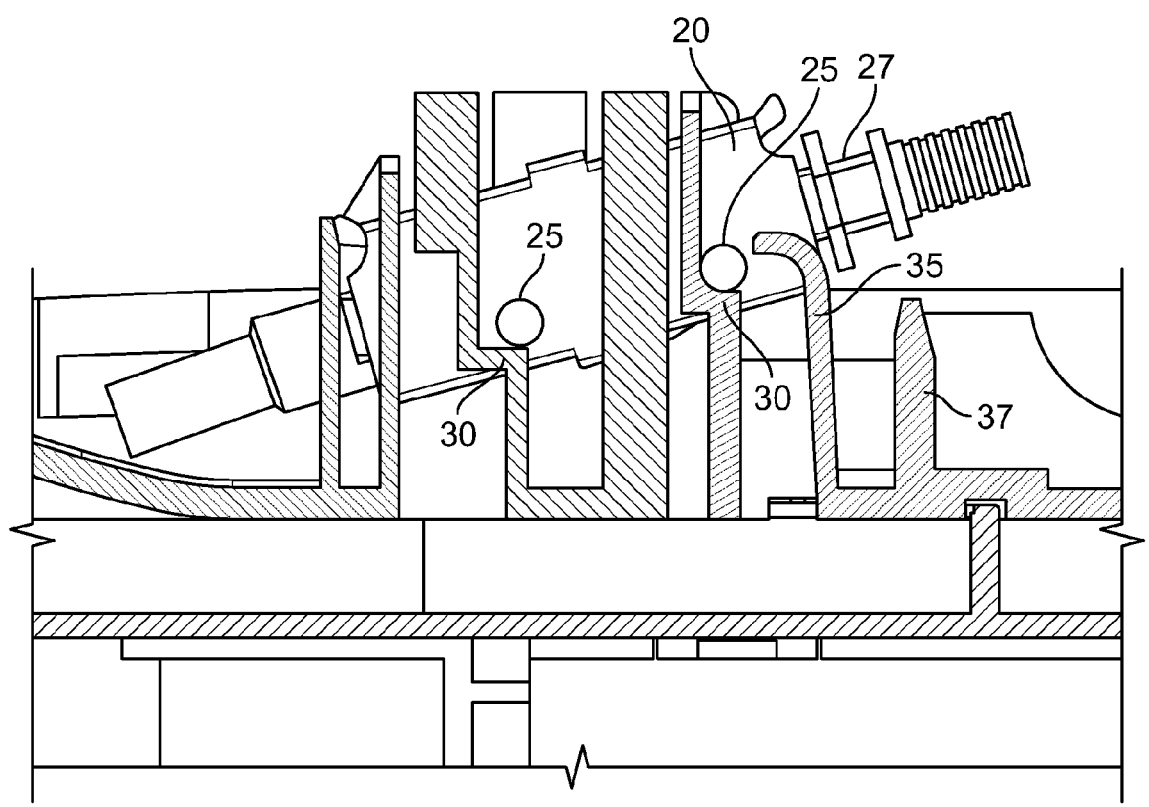
Figure 4:
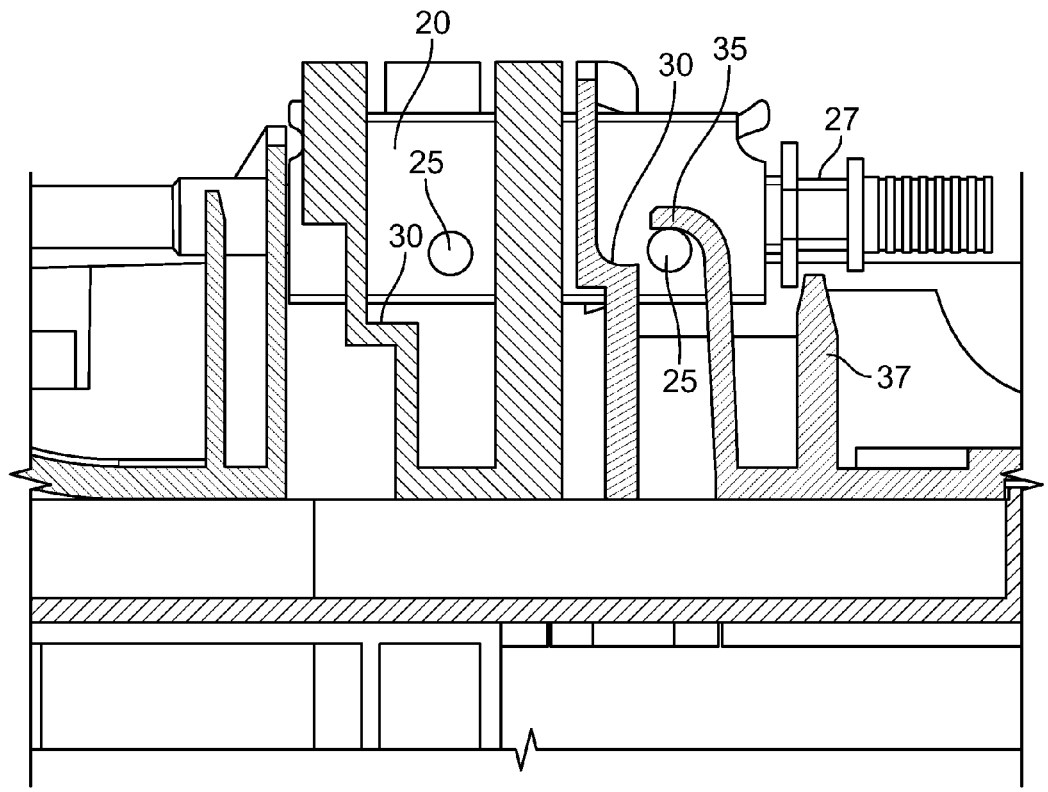
Figure 5:
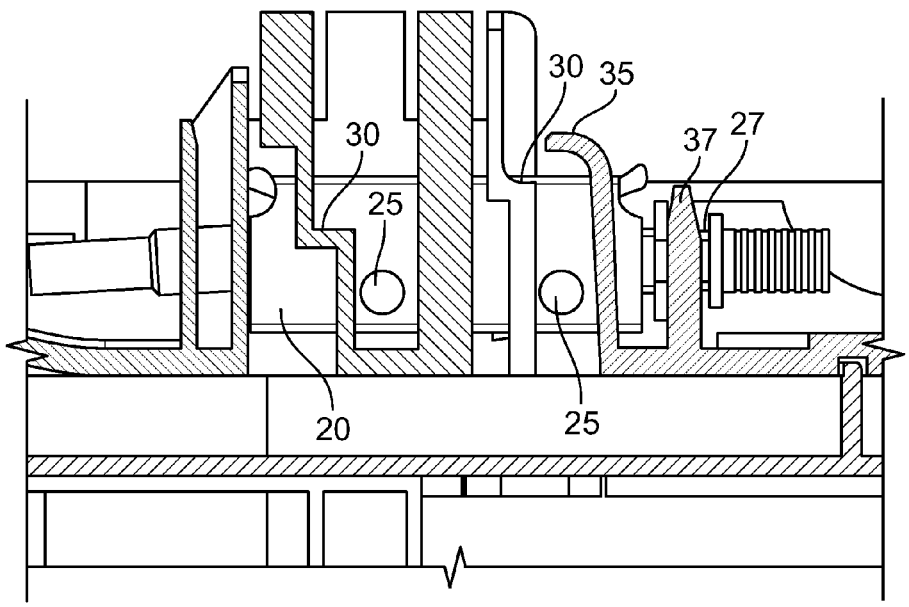
Figure 6A:
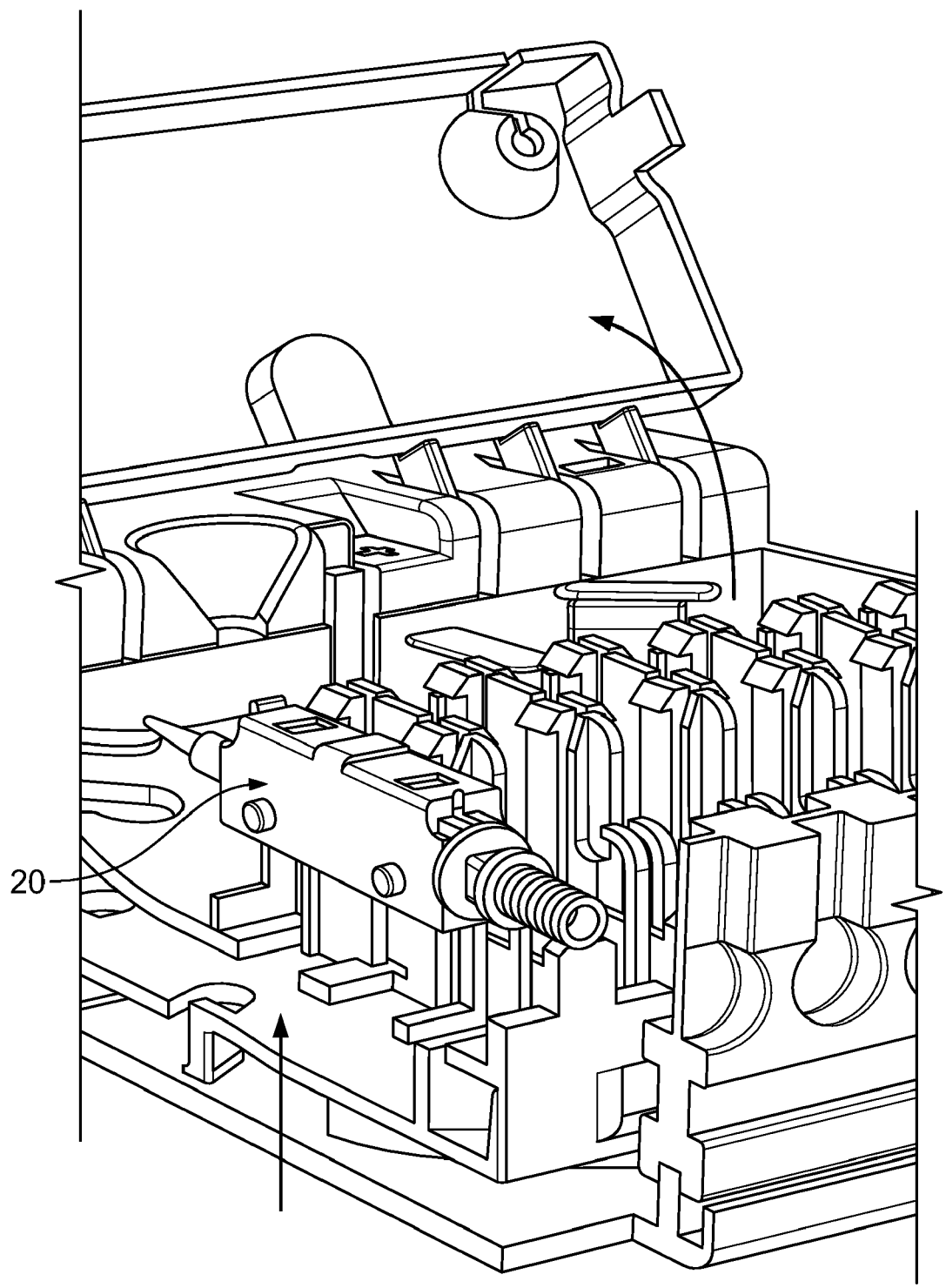
Figure 6B:
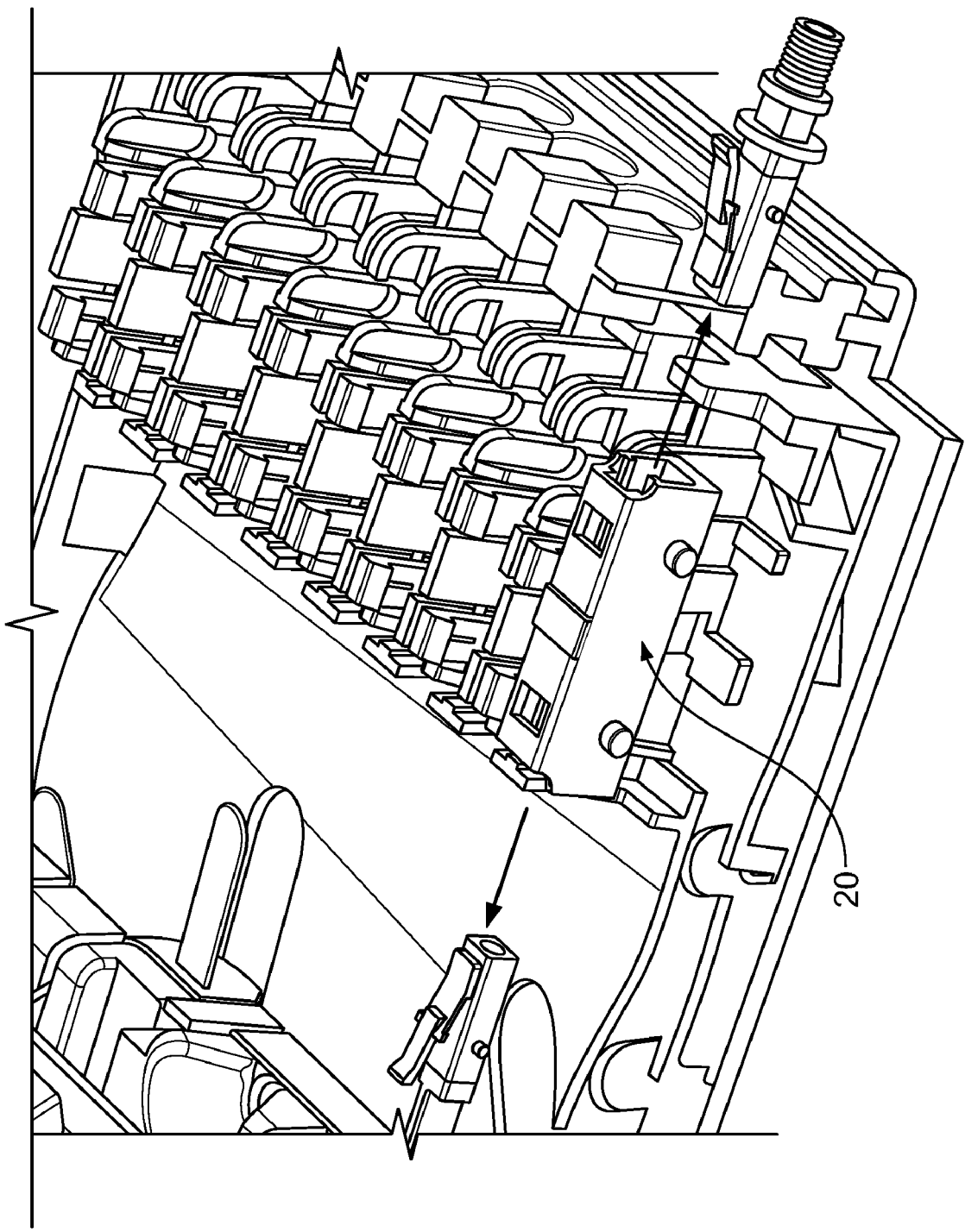
Figure 6C:
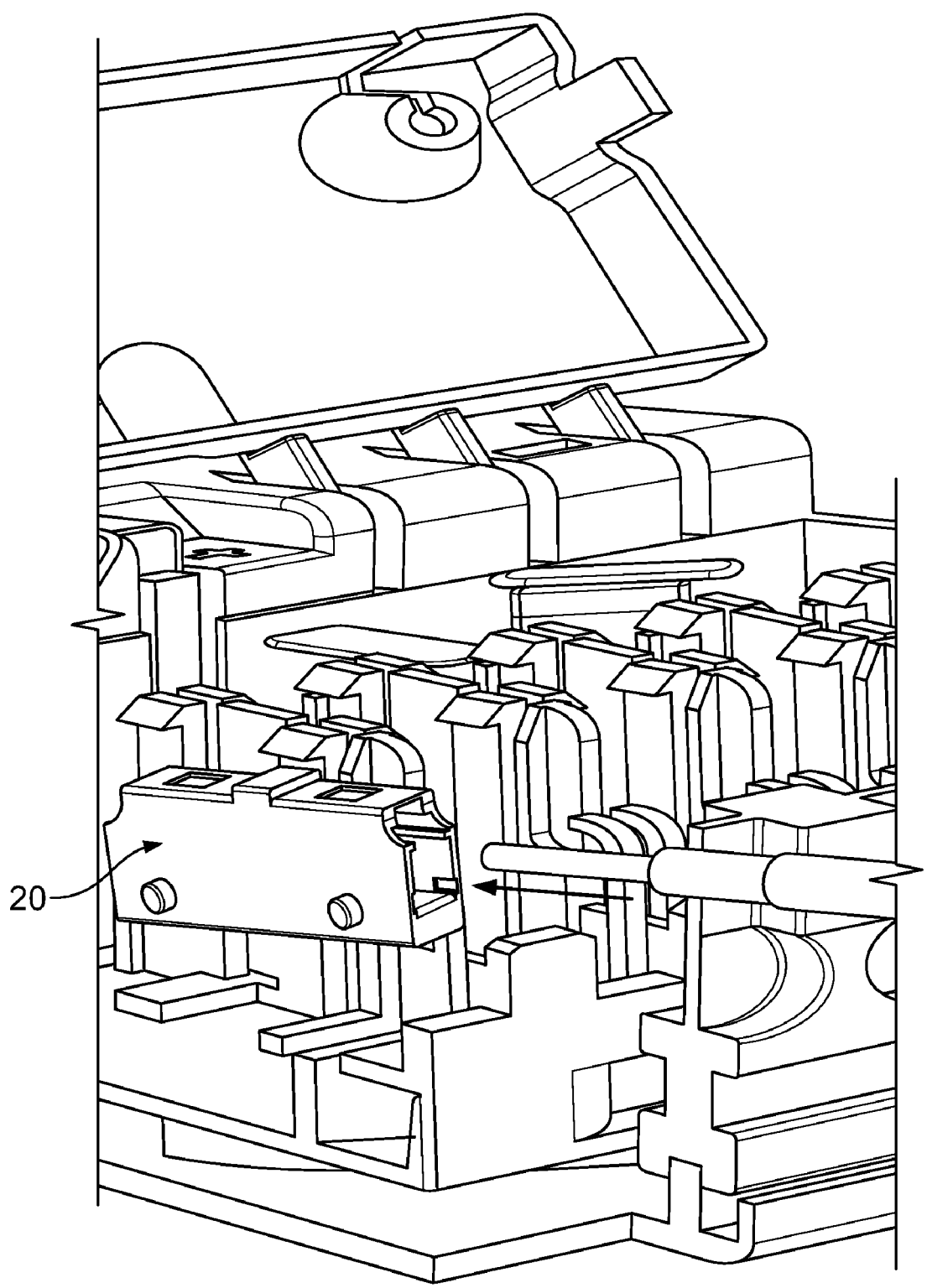

Specific embodiments of the invention will now be described by way of example, with reference to FIG. 2 et seq of the accompanying drawings, wherein:

FIG. 2 shows in perspective a simplex adaptor 20 for optical connectors having two rounded mounting bosses 25 protruding from its side in a sense lateral to its connector-receiving axis, FIG. 3 shows the adaptor 20 mounted in an inclined waiting position in the mounting support with the mounting bosses 25 supported on shoulders 30 formed in the slots of the upstanding support walls and a spring portion 35 of the wall members holding one of the bosses resiliently in that position. Also shown is retention means 27 of a drop cable connector inserted into the adaptor ready for engagement with upstanding retaining member 37 when the adaptor is lowered to its working position;

FIG. 4 shows the adaptor 20 of FIG. 3 in a level position above the support, with the connector retention mechanism 27 above the upstanding retaining member 37, awaiting optional cleaning and movement downwards (as illustrated) to its operating position;

FIG. 5 shows the operating position, where the mounting bosses 25 of the adaptor 20 and the connector retention mechanism 27 on the retaining member 37 have some clearance for movement along the connector-receiving axis;

FIG. 6 shows three perspective views of a drop cable mounting box in which a plurality of drop cable connectors may be terminated closely side-by-side in adaptors 20 of assemblies according to the present invention. The adaptor 20 is shown in a cleaning position in FIG. 6a reached by opening the box lid and raising the adaptor in the directions indicated by arrows. A connector-insertion position is shown in FIG. 6c), where an optical connector (not shown) on a cable end can be inserted into the tilted adaptor 20 in the direction of the arrow adjacent to the cable. A disconnection position is shown in FIG. 6b, where the illustrated optical connectors are withdrawn from the raised adaptor 20 in the opposed directions indicated by respective arrows.

The invention claimed is:

1. An assembly of a mounting support and an optical fibre connector adaptor mounted on the support, wherein the adaptor has a connector-receiving axis and at least one lateral mounting projection on at least a first one of its sides, and the mounting support comprises wall members upstanding from the support on both sides of the said adaptor, which wall members on at least one side of the adaptor define mounting slots adapted to receive the said mounting projections of the adaptor, and wherein the slots are formed to permit movement of the adaptor between at least a first position in which the adaptor is supported with its said axis at an acute angle to the support, and a working position in which the adaptor is supported with its said axis lying substantially parallel to the support, and wherein the wall members define, in at least one of the said slots, at least one shoulder on which one of the mounting projections of the adaptor can be supported, and at least one resilient portion of the wall member is arranged adjacent the shoulder to retain that mounting projection removably on the said shoulder, wherein the adaptor has at least two mounting projections on each of its sides, wherein the mounting support has at least two slots in each wall to receive the mounting projections on each of its sides, wherein the mounting support has at least one shoulder in each said slot; and wherein the shoulders at one end are at a different level than the shoulders at the other end, whereby the adaptor is held at the acute angle by virtue of the engagement of the projections at varying height shoulders.

2. An assembly according to claim 1, wherein the slots are arranged to hold the adaptor loosely in the said working position.

3. An optical assembly, comprising:
an optical fibre connector adaptor wherein the adaptor has a connector-receiving axis and at least one mounting projection on at least a first one of its sides lateral to the connector-receiving axis, and
a mounting support defining at least one mounting slot, at least one upwardly facing shoulder on which the at least one mounting projection of the adaptor can be supported, and at least one resilient portion being arranged to retain that mounting projection removably on the least one shoulder; wherein
the adapter is mountable on the support with the slot formed to permit movement of the adaptor between at least a first position in which the adaptor is supported with its said axis at an acute angle to the support, and a working position in which the adaptor is supported with its said axis lying substantially parallel to the support, wherein the adaptor has at least two mounting projections on each of its sides, wherein the mounting support has at least two slots in each wall to receive the mounting projections on each of its sides, wherein the mounting support has at least one shoulder in each said slot; and wherein the shoulders at one end are at a different level than the shoulders at the other end, whereby the adaptor is held at the acute angle by virtue of the engagement of the projections at varying height shoulders.

4. An assembly according to claim 3, wherein the mounting support comprises wall members upstanding from the support on both sides of the said adaptor.

5. An assembly according to claim 4, wherein the wall members define the mounting slot adapted to receive the said mounting projection of the adaptor.

6. An assembly according to claim 3, wherein the slots are arranged to hold the adaptor loosely in the said working position.

7. An assembly according to claim 3, wherein the slots have a width at least twice the width of the projections.

8. An assembly according to claim 3, wherein each of the slots include downwardly extending slot portions extending from a front edge of the shoulders, whereby the adaptor may be moved forwardly to a position where the projections clear the shoulders and extend downwardly into the downwardly extending slot portions.

* * * * *